Dec. 2, 1947.  W. E. CAMPBELL  2,431,731
SOIL DISPLACEMENT PLOW
Filed Sept. 18, 1945  2 Sheets-Sheet 1
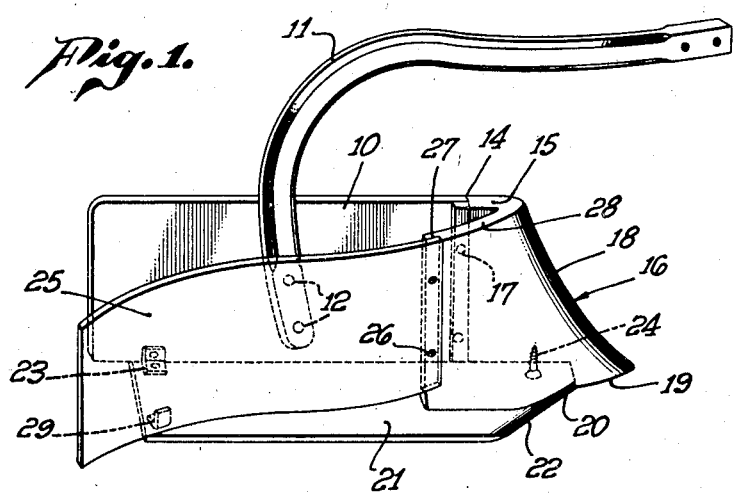
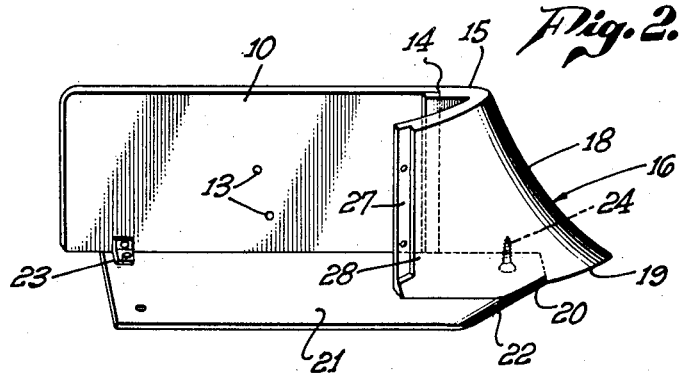
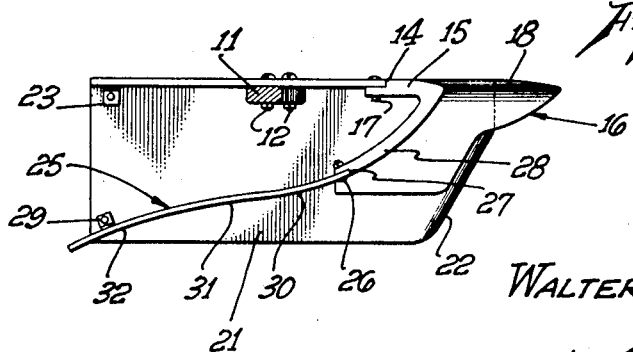
WALTER E. CAMPBELL,
INVENTOR.
BY
ATTORNEY.

Dec. 2, 1947.  W. E. CAMPBELL  2,431,731
SOIL DISPLACEMENT PLOW
Filed Sept. 18, 1945  2 Sheets-Sheet 2

WALTER E. CAMPBELL,
INVENTOR

BY [signature]

ATTORNEY

Patented Dec. 2, 1947

2,431,731

UNITED STATES PATENT OFFICE 2,431,731

SOIL DISPLACEMENT PLOW

Walter E. Campbell, Greensboro, N. C.

Application September 18, 1945, Serial No. 617,052

10 Claims. (Cl. 97—113)

1

This invention relates generally to plows, and has for its primary object to provide an improved type of plow differing in its form and soil-displacing action in certain fundamental respects from all conventional and prior kinds of plows of which I am aware.

The characteristic purpose and action of the ordinary plow is of course to turn under and substantially invert the top soil, and in so doing, to bury the surface vegetation beneath the up-turned sub-soil. In keeping with current beliefs and theories of proper soil conditioning, inversion of the soil in this manner is regarded as failing to maintain the surface soil in best condition either physically or from the standpoint of maximum fertility and productiveness.

For the purposes of the present invention it is considered that the top soil should be thoroughly loosened and cut beneath, all in a manner permitting the removal of weeds and noxious grasses, but without substantial turning under, so that after plowing, the normal surface soil will still remain at the top. To accomplish this objective, I have developed a plow having for its essential action and purpose, to cut beneath and laterally displace the soil, and at the same time to loosen the displaced soil thoroughly or adequately to permit subsequent removal of weeds and grasses, as by a spike-tooth harrow or other suitable equipment.

In accordance with the invention, I have provided a new type and form of plow comprising, in its preferred form, a lateral member or blade which serves to cut substantially horizontally beneath the soil, and a laterally facing member or mold board acting to bodily displace the soil transversely of the line of advancement of the plow, however without substantial turning under of the displaced soil. In conjunction with these parts, I provide opposite the mold board a side structure operable to form preferably a vertically extending shoulder of land upon advancement of the plow and against which the plow bears.

A particular object and feature of importance is the provision of a mold board section or lateral soil displacing means, operable to serve the dual purposes of shifting and effectively loosening the soil. Preferably this section of the plow comprises a mold board of irregular or reverse surface curvature overlying the aforementioned blade and extending angularly and in an essentially vertical position so as to shift and simultaneously loosen the soil against which it advances.

Further objects and features of the invention, as well as the details of a typical and preferred

2 embodiment, will be better understood from the following description, throughout which reference is had to the accompanying drawings, in which:

Fig. 1 is a view of one form of the plow in side perspective;

Fig. 2 is a similar view but with the mold board and beam removed;

Fig. 3 is a plan view of Fig. 1;

Figure 4:
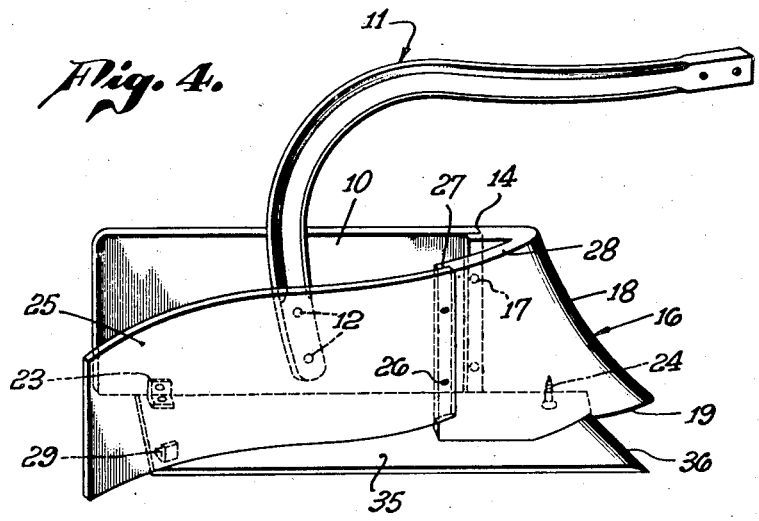
Fig. 4 is a view similar to Fig. 1 showing a variational and preferred form of the invention.

The plow structure comprises a frame member preferably in the form of a vertically positioned plate 10 to which the draft beam 11 is attached by bolts 12 inserted through openings 13 in the plate. The forward edge of plate 10 is received at 14 within the notched or recessed flange 15 of the plow share 16, and is secured thereto by screws 17, or other suitable means. The plate or vertical member 10 cooperates with the plow share 16 to form a distinct vertical shoulder of land upon advancement of the plow, as will hereinafter appear. The share 16 may be formed as a single casting having an advance relatively sharp edge 18 of forward and downward curvature, substantially as illustrated. Rearwardly of its forward and substantially horizontal bottom surface 19, the share 16 is recessed at 20 substantially the thickness of the laterally projecting blade 21. Blade 21 may have substantially parallel sides and a forward sharpened cutting edge 22 extending outwardly and rearwardly from the share 16 at the shoulder formed by the recess 20. As illustrated, the blade 10 and share 16 overlie the blade 21, being secured thereto respectively by angle piece 23 and one or more screws 24.

The mold board 25 consists preferably of a vertically positioned plate having a forward edge received and secured by screws 26 within the notched portion 27 of the share flange 28. The bottom portion of the mold board engaging the top surface of the blade 21, may be suitably secured thereto as by means of angle piece 29. As illustrated, the blade 21 projects laterally beyond portions of both the share 16 and mold board 25, so as to be capable of cutting horizontally beneath the soil simultaneously being laterally displaced by the share and mold board. In order that it may serve the dual functions of displacing and loosening the soil, the mold board is given shape characteristics such that as the plow is advanced, the mold board exerts successive varying degrees of lateral pressure against the soil, all in a manner tending effectively to loosen the soil as it is displaced. For this purpose, the mold board is given irregular and preferably substantially reversed horizontal curvature, the forward portion having relatively greater outward curvature at 30, the intermediate portion at 31 having reduced curvature of a reversing order, and the rear portion at 32 having further increased outward curvature.

As the plow is advanced in operation, the soil is cut and divided by the share 16 which in cooperation with the plate 10 forms a vertical soil cut and land shoulder which laterally supports the plow against the side thrust resulting from lateral displacement of the soil by and in the direction of flange 28 and the mold board. Simultaneously, the laterally projecting blade 21 serves to cut horizontally beneath the displaced soil and to sever all roots to the depth thereof. When engaged by the mold board 25, the latter, by virtue of its essentially vertical position serves to effect further lateral displacement of the soil but without substantially turning the soil under. And as described, by virtue of its irregular curvature and the resultant variation of pressure against the soil being displaced, the mold board has an effective loosening and disintegrating action against the soil.

After the top soil has thus become transversely displaced and thoroughly loosened, any weeds or noxious grasses may be removed, as by the use of a suitable type of harrow. The end result of the plowing and harrowing operations will have been to shift and remove vegetation from the soil, but with the top soil remaining in a substantially unturned condition.

Figure 5:
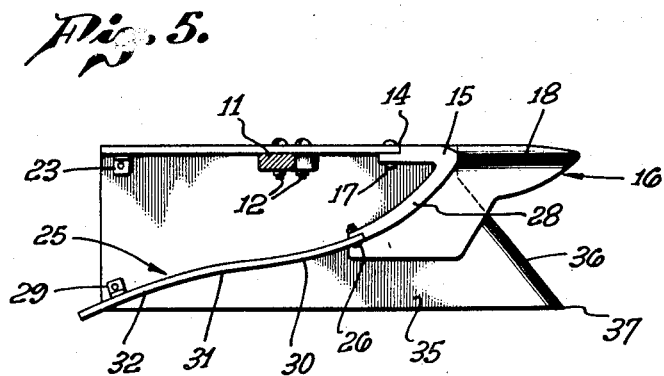
Fig. 5 is a plan view of Fig. 4.

Figs. 4 and 5 illustrate a variational and preferred embodiment of the invention differing from the described form primarily with respect to the particular shape characteristics of the bottom horizontal plate or blade. All parts other than the horizontal blade are designated by the same reference characters as the corresponding parts in Figs. 1 to 3. Referring to Figs. 4 and 5, the blade 35 is shown to underlie and be attached to the share 16, plate 10 and mold board 25 as before, but to be extended forwardly of the plow to have a front cutting edge 36, the forward extremity 37 of which preferably extends substantially opposite or at least close to lateral alinement with the forward-most point of the share 16. As illustrated, the cutting edge 36 may extend angularly with relation to the longitudinal axis of the plow, and preferably in a direction outwardly and forwardly from the share. By so shaping and extending the blade 35, any tendency of the plow to turn the soil is reduced, and its sub-soil cutting and displacing action materially improved.

This application is a continuation-in-part of my application Serial Number 552,724, filed September 5, 1944, on "Soil displacement plow."

I claim:

1. A plow of the character described comprising a forward share portion operable to cut the soil upon advancement of the plow and form a substantially vertical soil shoulder, a horizontal blade for cutting the soil horizontally at one side of said shoulder and at substantially the depth penetrated by said share, and means for displacing the soil severed by said blade laterally away from said shoulder and without turning the displaced soil under.

2. A plow of the character described comprising a forward share portion operable to cut the soil upon advancement of the plow and form a substantially vertical soil shoulder, a horizontal blade underlying said share portion for cutting the soil horizontally at one side of said shoulder and at substantially the depth penetrated by said share, and means for displacing the soil severed by said blade laterally away from said shoulder and without turning the displaced soil under.

3. A plow of the character described comprising a forward share portion and a vertically extending side operable upon advancement of the plow to cut the soil and form a substantially vertical soil shoulder against which said side bears, a horizontal blade for cutting the soil horizontally at one side of said shoulder and at substantially the depth penetrated by said share, and a mold board extending angularly from said share with relation to said side and operable to displace the soil severed by said blade laterally away from said shoulder and without turning the displaced soil under.

4. A plow of the character described comprising a forward share portion and a vertically extending side operable upon advancement of the plow to cut the soil and form a substantially vertical soil shoulder against which said side bears, a horizontal blade for cutting the soil horizontally at one side of said shoulder and at substantially the depth penetrated by said share, and a mold board extending angularly from said share with relation to said side and operable to displace the soil severed by said blade laterally away from said shoulder and without turning the displaced soil under, and a draft beam connected to said vertically extending side.

5. A plow of the character described comprising a forward share portion and a vertically extending side operable upon advancement of the plow to cut the soil and form a substantially vertical soil shoulder against which said side bears, a horizontal blade for cutting the soil horizontally at one side of said shoulder and at substantially the depth penetrated by said share, and a mold board of reverse curvatures extending angularly from said share with relation to said side and operable to displace the soil severed by said blade laterally away from said shoulder and without turning the displaced soil under.

6. A plow of the character described comprising a forward share portion and a vertically extending side operable upon advancement of the plow to cut the soil and form a substantially vertical soil shoulder against which said side bears, a horizontal blade for cutting the soil horizontally at one side of said shoulder and at substantially the depth penetrated by said share, and a mold board connected to and extending angularly from said share with relation to said side and operable to displace the soil severed by said blade laterally away from said shoulder and without turning the displaced soil under, the forward edge of said blade extending laterally from said share portion at a location in advance of its connection with the mold board.

7. A plow of the character described comprising a forward share portion operable to cut the soil upon advancement of the plow and form a substantially vertical soil shoulder, a horizontal blade for cutting the soil horizontally at one side of said shoulder and at substantially the depth penetrated by said share, and means for displacing the soil severed by said blade laterally away from said shoulder and without turning the displaced soil under, the front edge of said blade extending outwardly and forwardly of the plow from said share portion.

8. A plow of the character described comprising a forward share portion and a vertically extending side operable upon advancement of the plow to cut the soil and form a substantially vertical soil shoulder against which said side bears, a horizontal blade for cutting the soil horizontally at one side of said shoulder and at substantially the depth penetrated by said share, and a mold board extending angularly from said share with relation to said side and operable to displace the soil severed by said blade laterally away from said shoulder and without turning the displaced soil under, the front edge of said blade extending outwardly and forwardly of the plow from said share portion.

9. A soil displacement plow comprising a forward share, a horizontal blade acting to cut horizontally beneath the soil as the plow is advanced, and a mold board extending rearwardly of the plow from said share and acting to displace the soil laterally of said blade without substantially turning the displaced soil under, said blade extending beyond one side of said share and mold board and the front edge of said blade extending outwardly and forwardly of the plow from said share.

10. A soil displacement plow comprising a forward share, a horizontal blade acting to cut horizontally beneath the soil as the plow is advanced, and a mold board extending rearwardly of the plow from said share and acting to displace the soil laterally of said blade without substantially turning the displaced soil under, said blade extending beyond one side of said share and mold board and the front edge of said blade extending outwardly from said share portion to a location substantially opposite the most forward portion of the share.

WALTER E. CAMPBELL.

REFERENCES CITED

The following references are of record in the file of this patent:

UNITED STATES PATENTS

| Number | Name | Date |
|--------|------|------|
| 20,790 | Harris | July 6, 1858 |
| 108,004 | Butler | Oct. 4, 1870 |
| 413,076 | Maurin | Oct. 15, 1889 |
| 690,227 | Baldwin | Dec. 31, 1901 |
| 790,464 | Toler | May 23, 1905 |